US012811954B2

(12) United States Patent
Shaw

(10) Patent No.: US 12,811,954 B2
(45) Date of Patent: Nov. 24, 2026

(54) ACTIVE VERIFICATION OF SECURITY INFRASTRUCTURE

(71) Applicant: Sophos Limited, Abingdon (GB)

(72) Inventor: Jonathan Michael Shaw, Abingdon (GB)

(73) Assignee: Sophos Limited, Abingdon (GB)

( * ) Notice: Subject to any disclaimer, the term of this patent is extended or adjusted under 35 U.S.C. 154(b) by 115 days.

(21) Appl. No.: 18/523,073

(22) Filed: Nov. 29, 2023

(65) Prior Publication Data

US 2025/0175473 A1 May 29, 2025

(51) Int. Cl.
*H04L 9/00* (2022.01)
*H04L 9/40* (2022.01)

(52) U.S. Cl.
CPC ........ *H04L 63/1416* (2013.01); *H04L 63/145* (2013.01); *H04L 63/20* (2013.01)

(58) Field of Classification Search
CPC ... H04L 63/1416; H04L 63/145; H04L 63/20; H04L 63/0263; H04L 63/1433
See application file for complete search history.

(56) References Cited

U.S. PATENT DOCUMENTS 11,611,580 B1 3/2023 Sharifi Mehr et al.
2002/0133586 A1* 9/2002 Shanklin ................. H04L 43/06 709/224
2011/0208849 A1 8/2011 Barnett et al.
2016/0267284 A1* 9/2016 Willis ...................... H04L 63/08
2024/0048565 A1* 2/2024 Milden ................. H04L 63/123
2025/0141896 A1* 5/2025 Thomas .............. H04L 63/1425

FOREIGN PATENT DOCUMENTS

JP 2009212985 9/2009
WO WO-2022087510 A1 * 4/2022 ............. G06F 21/34

* cited by examiner

*Primary Examiner* — Syed M Ahsan
(74) *Attorney, Agent, or Firm* — Strategic Patents, P.C.

(57) ABSTRACT

In order to actively monitor functioning of security infrastructure such as local security agents on endpoints in an enterprise system, a security update is created for the endpoints that includes a detection rule for use by the local security agents, along with a separate computing object including a trigger for the detection rule. The security update can be stored, e.g., at a threat management facility or similar, for retrieval by endpoints during a security update. When the security update is retrieved by an endpoint, it can be unpacked to add the detection rule to the local security agent, and then to add the trigger to the endpoint protected by the local security agent. A successful detection of the trigger by the (updated) local security agent on an endpoint can be transmitted to the threat management facility as a verification that the endpoint security measures are properly functioning and receiving updates.

20 Claims, 4 Drawing Sheets

ACTIVE VERIFICATION OF SECURITY INFRASTRUCTURE

BACKGROUND

A security infrastructure may be used to provide security for, e.g., devices, user accounts, and data in an enterprise network. While various tools are known for updating a security infrastructure of an enterprise network, there remains a need for techniques to ensure that security updates are properly distributed and deployed for protection of enterprise resources.

SUMMARY

In order to actively monitor the proper functioning of local security agents that are used to secure endpoints in an enterprise system, a security update is created for the local security agents that includes a detection rule for use by the local security agents, along with a separate computing object that includes a trigger for the detection rule. The security update can be stored, e.g., at a threat management facility or the like, for retrieval by endpoints during a security update. When the security update is retrieved by an endpoint, the security update can be unpacked to add the detection rule to the local security agent, and then to add the trigger to the endpoint that is protected by the local security agent (with the new detection rule). A successful detection of the trigger by the updated local security agent on an endpoint can be transmitted to the threat management facility as a verification that the endpoint is properly receiving and installing security updates.

In one aspect, there is disclosed herein a computer program product for actively testing security services for an enterprise network, the computer program product comprising computer executable code embodied in a non-transitory computer readable medium that, when executing on one or more computing devices, causes the one or more computing devices to perform the steps of: executing a local security agent on an endpoint; transmitting a security update from a threat management facility to the local security agent, wherein the security update includes: a detection rule for the local security agent, the detection rule identified as a test rule, and a trigger for the detection rule, the trigger configured to cause a detection by the local security agent when applying the detection rule, and the trigger being free from malware requiring remediation of the endpoint; adding the detection rule to a plurality of detection rules used by the local security agent to monitor the endpoint; in response to adding the detection rule to the local security agent, storing the trigger on the endpoint; detecting the trigger with a detection by the local security agent based on the detection rule; and transmitting a notification of the detection to the threat management facility.

The computer program product may further include code for performing the step of retrieving the security update with the local security agent during a periodic update initiated by the local security agent or the threat management facility. The detection rule may include a static detection rule. The detection rule may include a behavioral test. The detection rule may include a Uniform Resource Locator test. The endpoint point may include a network device in the enterprise network. The network device may include at least one of a router, a switch, a gateway, a firewall, and a wireless access point.

In another aspect, there is disclosed herein a method for actively testing security services for an enterprise network, the method comprising: storing a security update on a threat management facility at a location accessible to a plurality of endpoints managed by the threat management facility, wherein the security update includes: a detection rule for local security agents on the plurality of endpoints, the detection rule identified as a test rule, and a trigger for the detection rule, the trigger configured to cause a detection by one of the local security agents when applying the detection rule; transmitting the security update to one or more of the plurality of endpoints; logging transmittals of the security update to the one or more of the plurality of endpoints; logging test responses to the trigger from the plurality of endpoints to the trigger; and in response to a predetermined pattern of transmittals and test responses, initiating a remediation of one or more of the plurality of endpoints.

The remediation may include a notification to initiate investigation of one or more of the plurality of endpoints. The remediation may include one or more of a quarantine, an isolation, and a malware scan of one or more of the plurality of endpoints. The remediation may include a local security agent reinstallation on one or more of the plurality of endpoints. The predetermined pattern may include an absence of a test response from one of the plurality of endpoints that retrieved the security update from the threat management facility. The predetermined pattern may include a malware detection unrelated to the security update from one of the plurality of endpoints. The predetermined pattern may include an absence of security update requests from one or more of the plurality of endpoints. The detection rule and the trigger may be packaged into a single file as the security update for retrieval by the plurality of endpoints. The detection rule may include a static detection rule based on a checksum, and wherein the trigger may be a test file with the checksum. The detection rule may include a behavioral detection rule, and wherein the trigger may be configured to cause one of the plurality of endpoints to perform a plurality of activities associated with the behavioral detection rule. The detection rule may include a Uniform Resource Locator rule, and the trigger may be configured to cause a receiving one of the plurality of endpoints to try to connect to a network address specified in the Uniform Resource Locator rule. In another aspect, the detection may include a real time detection based on monitoring of reads and writes by a file system of a receiving one of the endpoints.

In another aspect, there is disclosed herein a system including: a plurality of local security agents executing on a plurality of endpoints in an enterprise network, each of the plurality of local security agents configured by a first computer executable code stored in a first non-transitory computer readable medium to manage security for a corresponding one of the endpoints based on a plurality of detection rules; and a threat management facility for the enterprise network, the threat management facility executing on a second one or more processors and configured by a second computer executable code stored in a second non-transitory computer readable medium to perform the steps of: storing a security update on a threat management facility at a location accessible to the plurality of endpoints, wherein the security update may include: a detection rule for local security agents on the plurality of endpoints, and a trigger for the detection rule, the trigger configured to cause a detection by one of the local security agents when applying the detection rule; transmitting the security update to one or more of the plurality of endpoints; logging transmittals of the security update to the one or more of the plurality of endpoints; logging test responses to the trigger from the plurality of endpoints to the trigger; and in response to a predetermined pattern of transmittals and test responses, initiating a remediation of one or more of the plurality of endpoints.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
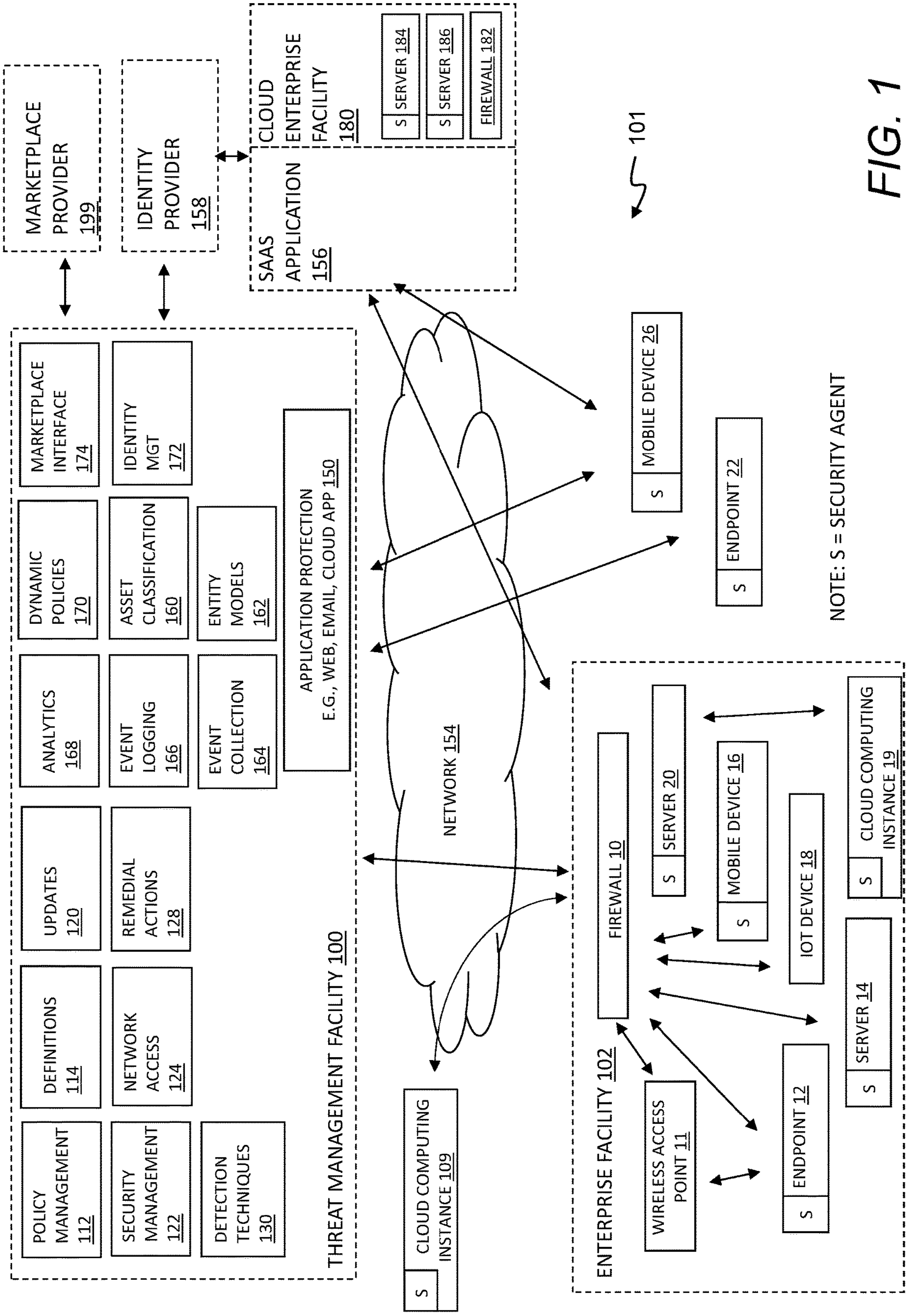
FIG. 1 is a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth.

Recitation of ranges of values herein are not intended to be limiting, referring instead individually to any and all values falling within the range, unless otherwise indicated herein, and each separate value within such a range is incorporated into the specification as if it were individually recited herein. The words “about,” “approximately” or the like, when accompanying a numerical value, are to be construed as indicating a deviation as would be appreciated by one of ordinary skill in the art to operate satisfactorily for an intended purpose. Similarly, words of approximation such as “approximately” or “substantially” when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language (“e.g.,” “such as,” or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as “first,” “second,” “top,” “bottom,” “up,” “down,” and the like, are words of convenience and are not to be construed as limiting terms.

It should also be understood that endpoints, devices, compute instances, or the like that are referred to as “within” an enterprise network may also be “associated with” the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context. Unless stated otherwise a compute instance or endpoint should be understood to include any hardware, software, or combination of the foregoing suitable for use as a virtual or physical computing device, and suitable for secure management by a threat management facility as described herein. Thus, an endpoint or compute instance may generally include a hardware device, a virtual device, or some combination of these, unless otherwise explicitly stated or clear from the context.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. The threat management facility 100 may be any service or combination of services useful for providing security to an enterprise network, such as an enterprise network associated with customer tenants. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility 102. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. The security agent S is sometimes referred to herein as a local security agent S. For example, when a particular instance of the security agent S is implemented on an endpoint 22 of the threat management system 101, it may be referred to as a local security agent S, as the security agent S is local to the endpoint 22. Some or all of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application 156, to a cloud enterprise facility 180, or both. In embodiments, the SaaS application 156 and the cloud enterprise facility 180 may be provided separately, or the SaaS application 156 may be hosted on the cloud enterprise facility 180. Centralized identity providers such as Microsoft Azure, may be used by an enterprise facility 102 instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application 156 and/or cloud enterprise facility 180 access, remediate the user's system, or such other steps as may be useful.

In embodiments, the cloud enterprise facility 180 may include servers 184, 186, and a firewall 182. The servers 184, 186 on the cloud enterprise facility 180 may run one or more enterprise applications and make them available to the enterprise facility's 102 compute instances 10-26. It should be understood that there may be any number of servers 184, 186 and firewalls 182, as well as other compute instances in a given cloud enterprise facility 180. It also should be understood that a given enterprise facility 102 may use both SaaS applications 156 and cloud enterprise facilities 180, or, for example, a SaaS application 156 may be deployed on a cloud enterprise facility 180. As such, the configuration in FIG. 1 is shown by way of example, and other arrangement are also possible.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 19, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, or secondary location threats to name a few, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as the SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with the identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent S of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URL filtering, and the like. Aspects of the web security and control may be provided, for example, in the security agent S of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URLs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances. Updates related to malware detection may be provided to security agents of various endpoints, such as the security agent S of the endpoint 22, for example, and the updates may include one or more tests for confirming that the updates have been received and that the malware detection aspects were correctly applied, as described in more detail below.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, the security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. The enterprise facility 102 may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent S of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from the security agent S running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from one or more of the compute instances 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-26 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent S of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that is accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be the identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
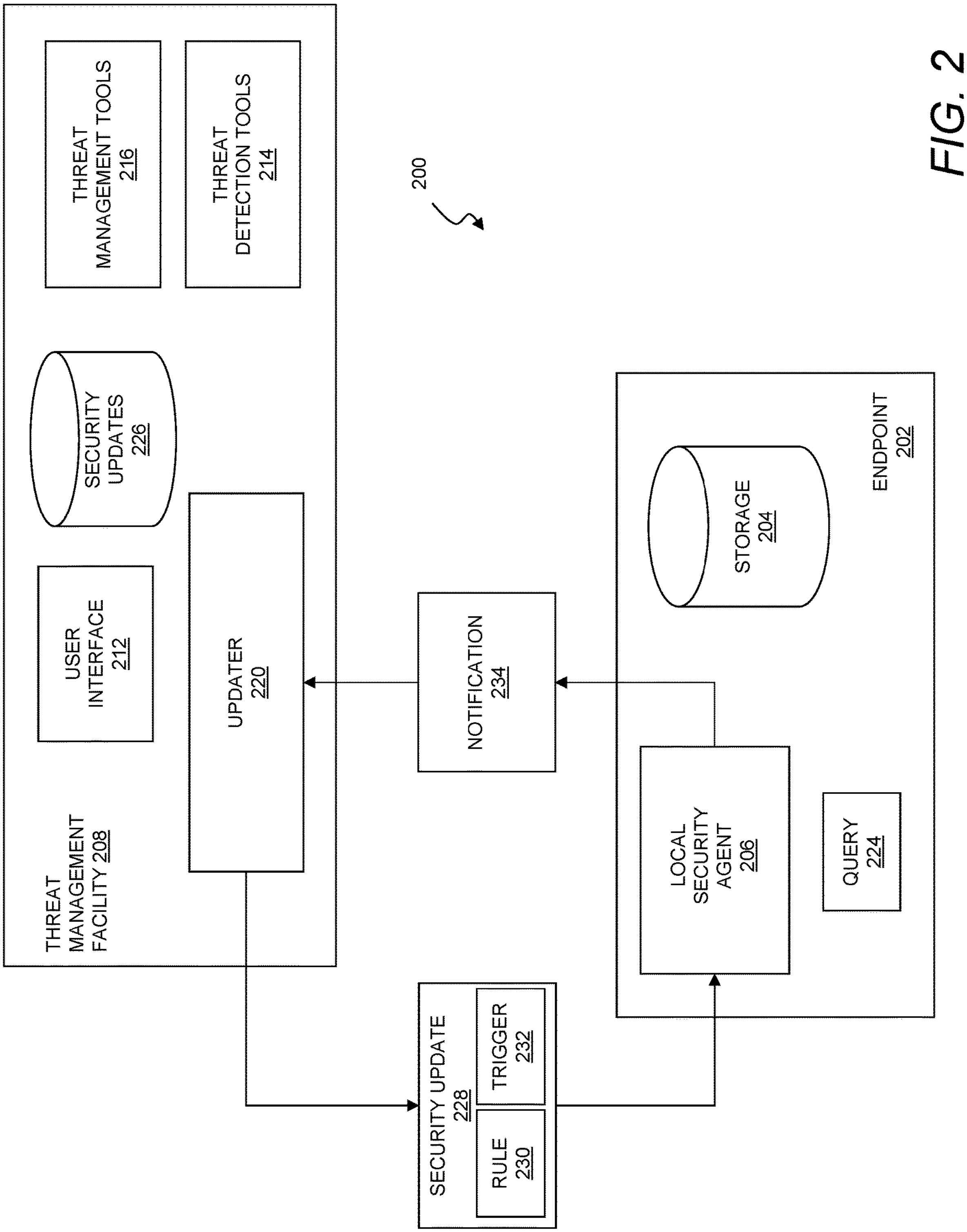
FIG. 2 is a block diagram of a system for testing a security update infrastructure.

FIG. 2 is a block diagram of a system for testing a security update infrastructure. As depicted in FIG. 2, a threat management system 200 may be configured to verify operation of security infrastructure as described herein. The threat management system 200 may be any of the threat management systems or related resources and facilities described herein, and may generally support or provide security services for an enterprise network with a threat management facility 208. As depicted, an endpoint 202, such as any of the endpoints described herein, may receive a security update 228 from the threat management facility 208. In order to actively monitor the functioning of security infrastructure such as a local security agent 206 on the endpoint 202 in the threat management system 200, an updater 220 or other update management facility can create store a security update 228, and distribute the security update 228 to the local security agent for the endpoint 202.

In general, the security update 228 may include any suitable update to the local security agent 206 including, e.g., software updates, malware definition updates, new detection rules, libraries, whitelists, reputation data, and so forth, any of which may be deployed locally by the local security agent 206 to update local security services. Security updates 228 may be pushed to the local security agent 206 in an update process initiated by the threat management facility 208, pulled to the local security agent 206 in an update process initiated by the local security agent 206, or some combination of these. In one aspect, a security update 228 for active verification of security infrastructure as described herein may include a detection rule 230 and a trigger 232. The detection rule 230 may be any rule for detecting malware, e.g., using any of the techniques described herein. However, in one aspect, when the detection rule 230 is a test rule for verifying proper operation of the local security agent 206 as described herein, the detection rule 230 is not configured to detect any known malicious code. Instead, the detection rule 230 is configured to detect the trigger 232, which is generally created specifically to trigger detection by the detection rule 230, and which is preferably a non-malicious computing object free from malware. By sending these two items to the endpoint 202 and deploying them sequentially—e.g., by updating the local security agent 206 with the detection rule 230, and then deploying the trigger 232 on the endpoint—the updater 220 (along with other components of the threat management facility 208, where needed) can verify that the local security agent 206 is receiving and installing updates properly based on the corresponding notification 234 returned from the local security agent 206. In general, the nature of the trigger 232 will depend on the nature of the detection rule 230 that it is intended to invoke, and may include any code, data, file(s), and so forth that can be deployed on the endpoint 202 in a manner that will trigger the detection rule 230. It will be appreciated that, while the updater 220 is depicted as deploying the security update 228 and receiving the notification 234, the functions may also or instead be perform by, or in cooperation with, other components of the threat management facility 208. For example, the threat detection tools 214 may be configured to receive event streams from local security agents 206 in the enterprise network, and may thus receive the notification 234 when it is returned from the local security agent 206. The threat detection tools 214 may then transmit information about the notification 234 to the updater 220. In another aspect, the updated 220 may provide information about the security update 228 to the threat detection tools 214, which may in turn monitor the enterprise network for patterns of responsive notifications from endpoints associated with the enterprise network. More generally, any combination of software components, modules, or the like associated with threat management facility 208 may be used to manage distribution of security updates 228 and monitoring of responsive notifications 234 as contemplated herein.

When trigger 232 is deployed on the endpoint 202, the local security agent 206 should, if properly updated with the detection rule 230, detect the trigger 232 and generate a notification 234 to the threat management facility.

The detection rule 230 (and the security update 228 containing the rule 230) can be stored with a plurality of other (e.g., previously sent) detection rules in a storage 204 on the endpoint 202. In one aspect, the detection rule 230 may be identified (e.g., explicitly identified by file name, or in metadata) as a test rule, which may cause the threat management facility 208 to respond appropriately. In particular, where the threat detection tools 214 of the threat management facility 208 are not configured to correlate notifications 234 with test rules, the detection rule 230 and notification 234 may self-identify as belonging to an infrastructure test without malicious content, in order to avoid unnecessary investigation or remediation. The security update 228 containing the detection rule 230 can also or instead be stored, e.g., at the threat management facility 208, e.g., in a security updates storage 226 for retrieval by the endpoint 202 in response to a security update request. The security updates storage 226 can also or instead store a pattern of deployments and responses for the security update 228 containing the detection rule 230, e.g., in order to monitor patterns of distribution and response for further investigation.

When the security update 228 is received by the endpoint 202, the security update 228 can be unpacked to add the detection rule 230 to the local security agent 206, and to add the trigger 232 for the detection rule to the endpoint 202 that is protected by the local security agent 206. A successful detection of the trigger 232 by the updated local security agent 206 on the endpoint 202 can be transmitted to the threat management facility 208 as a notification 234, indicating that the local security agent 206 for the endpoint 202 is properly receiving and deploying or installing updates.

The threat management facility 208 may include a user interface 212 supporting a web page or other graphical interface or the like, and may generally provide an interface for user interaction with the threat management facility 208, e.g., for threat detection, network administration, audit, configuration and so forth. This user interface 212 may generally facilitate management of security updates, configuration and deployment of new updates, investigation of patterns of responses, and the like, and to more generally support enterprise network security using active confirmation of security infrastructure as described herein.

The threat detection tools 214 may be any of the threat detection tools, algorithms, techniques or the like described herein, or any other tools or the like useful for detecting threats or potential threats within an enterprise network. This may, for example, include static tools, signature-based tools, behavioral tools, machine learning models, and so forth. In general, the threat detection tools 214 may use event data provided by the endpoint 202 within the network, as well as any other available context such as network activity, heartbeats, and so forth to detect malicious software or potentially unsafe conditions for a network or endpoints connected to the network, such as the endpoint 202 not adequately updating. In one aspect, the threat detection tools 214 may usefully integrate event data from a number of endpoints (including, e.g., network components such as gateways, routers, and firewalls) for improved threat detection in the context of complex or distributed threats. These tools may be used to monitor notifications 234 from endpoints 202 in an enterprise network in response to deployments of security updates 228, and more specifically to new test rules, as described herein.

The threat management tools 216 may generally be used to manage or remediate threats to the enterprise network that have been identified with the threat detection tools 214 or otherwise. Threat management tools 216 may, for example, include tools for sandboxing, quarantining, removing, or otherwise remediating or managing malicious code or malicious activity, e.g., using any of the techniques described herein. In the case of intentionally triggering a security response for testing purposes, the threat management tools 216 may be configured to identify corresponding notifications 234 and monitor patterns of responses for further investigation, e.g., by an administrator using the user interface 212.

The endpoint 202 may be any of the endpoints or other compute instances or the like described herein. This may, for example, include end-user computing devices, mobile devices, virtual compute instances, firewalls, gateways, servers, routers and any other computing devices or compute instances or the like that might be associated with an enterprise network. As described above, the endpoint 202 may generally include a local security agent 206 that locally supports threat management on the endpoint 202, such as by monitoring for malicious activity, managing updates, testing updates, managing security components, maintaining policy compliance, and communicating with the threat management facility 208 to support integrated security protection as contemplated herein. The local security agent 206 may, for example, coordinate instrumentation of the endpoint 202 to detect various event types involving various processes, executables, scripts, registry entries, files, data, plug-ins, configuration information, environment variables, directories, and other computing objects on the endpoint 202, and to supervise logging of such events in the storage 204. The local security agent 206 may also or instead scan computing objects such as electronic communications or files, monitor behavior of computing objects such as executables, and so forth. The local security agent 206 may, for example, apply signature-based detection techniques, behavioral threat detection techniques, machine learning models (e.g., models developed by the modeling and analysis platform), or any other tools or the like suitable for detecting malware or potential malware on the endpoint 202, as further described herein.

The storage 204 may log events occurring on or related to the endpoint 202. This may, for example, include events associated with computing objects on the endpoint 202 such as file manipulations, software installations, and so forth. This may also or instead include events associated with activities directed from the endpoint 202, such as requests for content from network locations, e.g., via Uniform Resource Locators, or other network activity involving remote resources. The storage 204 may record data at any frequency and any level of granularity consistent with proper operation of the endpoint 202 in an intended or desired manner.

In one aspect, the endpoint 202 may include a query interface 224 so that remote resources such as the threat management facility 208 can query the storage 204 remotely for additional information. This may include a request for specific events, activity for specific computing objects, or events over a specific time frame, or some combination of these. Thus, for example, the threat management facility 208 may request all changes to the registry of system information for the past forty-eight hours, all files opened by system processes in the past day, all network connections or network communications within the past hour, or any other parametrized request for activities monitored by the storage 204. In another aspect, the entire data log, or the entire log over some predetermined window of time, may be requested for further analysis at a remote resource. In general, the query interface 224 may support investigation or remediation related to a compromised local security agent 206, e.g., as detected based on patterns of responses to test rules as described herein.

Various methodologies can be used by the local security agent 206 of the threat management system 200 to detect malware (or, e.g., code intended to cause a reaction expected for the detection of malware) for testing that security updates have been adequately applied to the endpoint 202, including static detection, checksum tests, behavioral analysis, Uniform Resource Locator based detection, and machine learning analysis, to name a few. As described above, some or all of one or more of the various facilities described herein with respect to FIG. 1, for example, may be provided to support the local security agent 206 in performing endpoint protection as described herein.

Static detection is a method of identifying malicious software without or before executing or running the code or program on the endpoint 202. Rather than the local security agent 206 observing the behavior of the malware during execution, static analysis typically involves examining the code or file structure of a potential threat. Various attributes, such as file signatures, file metadata, and code patterns, can be analyzed to determine if the file contains known patterns or characteristics associated with malware. Because this analysis can occur before the file is executed, it can be a quick and proactive approach to identifying and categorizing potential threats. In one aspect, the detection rule 230 may be used to test whether the local security agent 206 is properly receiving updates to static detection rules.

In one aspect, updates to static detection rules may be tested using an update to checksum rules. Static detection rules such as checksum tests permit testing of a file for the presence of malware before execution (or, e.g., before use by an executable, script, or the like) in an environment protected by a local security agent. In order to apply a checksum test, a function such as cryptographic hash function (e.g., MD5, SHA-1, SHA-256, and so forth) is used to generate a checksum value for a file, and this checksum value can then be compared to a catalog of known checksums. In general, this may include a catalog of known, good files, in which case the checksum test may be used to ensure that the file has not been tampered with, or this may include a catalog of known, bad files, in which case the checksum test may be used to identify known, malicious code before it is permitted to deploy on an endpoint. In either case, a local security agent applying the static detection rules may be updated from time to time as new files (with new hashes) are identified.

In order to test the infrastructure for updating these static detection rules, a security update 228 with a detection rule 230 such as a new static detection rule, along with a trigger 232 such as a test file with a hash (or other identifier) matching the new static detection rule, may be transmitted to the endpoint 202. The new static detection rule may be any detection rule for associating a hash or other identifier with a known file. The new static detection rule may also or instead include a new algorithm or method for calculating a hash, or otherwise determining a signature or identifier for a file. The detection rule and the test file may be packaged, e.g., in a zipped file, compressed file, or other computing object that can be unpacked to obtain the individual components (e.g., detection rule 230 and trigger 232). In another aspect, a new static detection rule and the corresponding test file may be transmitted separately to the endpoint, thus permitting the detection rules for the local security agent to be updated before the test file arrives on the endpoint 202.

The local security agent 206 may be configured to check for updates to detection rules on a periodic basis (e.g., hourly, daily, etc.), and to retrieve any updates when they are available. In another aspect, the threat management facility 208 may be configured to periodically push updates to the local security agent 206, either on a schedule or as updates become available. Where updates are pushed from the threat management facility 208 in this manner, the frequency of updates may depend in part on the severity of associated threats, the number of potentially affected endpoints, and any other criteria useful for deciding when and where to distribute updates. The threat management facility 208 may also or instead push an update on a regular basis (e.g., daily) that includes a security update 228 with a detection rule 230 and a trigger 232 so that, regardless of any new threat data that is available, the integrity of the security updating infrastructure can be tested for the enterprise. In any case, the security update 228 can be included as a part of these updates, whether pulled by the local security agent 206, pushed from the threat management facility 208, or some combination of these. To further ensure the integrity of the updating infrastructure, a security update 228 may be securely packaged, employing encryption and/or password protection, in order to prevent malicious interference with the test process.

The detection rule 230 and the trigger 232 for the detection rule 230 may be packaged into a single file as the security update 228, or may be included with other security updates in an aggregated package or computing object. For example, for static detection rules, the security update 228 may be packaged in a virus identity file or other file or package containing descriptions for identifiers for known malware for transmittal to local security agents.

According to the foregoing, in one aspect, the detection rule 230 may be a static detection rule used to update static detection rules for the local security agent 206, and the trigger 232 may be a file with static characteristics (e.g., a hash, signature, metadata, etc.) matching the static detection rule. In one aspect, where the static detection rule has other qualifications (e.g., directory locations, filename extensions, file metadata, etc.), the trigger 232 may be deployed in a manner that satisfies those other qualifications in order to ensure that the trigger 232 will be detected by the rule 230 for a properly functioning and updated local security agent 206. Thus, where the trigger 232 is a file with a predetermined identifier, the file may be placed in a particular location within the system, such as a test directory, a system directory, or the like, where that location forms a part of the detection rule. On the other hand, the trigger 232 may be stored in any location if, for example, the system is configured to scan all files and locations on the disk for comprehensive coverage or to scan any new file that is saved on the endpoint 202.

The local security agent 206 may actively scan the endpoint 202 for the presence of the unique test file (e.g., the trigger 232) by monitoring reads and writes within the system in real time. As such, when the unique test file is stored, it may be hashed at that time to determine a checksum for the file. If the checksum value matches the stored detection signature, the unique test file is identified, the trigger 232 is detected with a detection based on the detection rule 230, and a notification 234 may be transmitted to the threat management facility. The notification 234 can include an indication that the checksum test was successful, thereby confirming that the security update 228 was correctly applied. Additional responses by the local security agent 206 can include actions such as transmitting a notification of the test result and security status of the endpoint 202. However, as distinguished from malicious code, which may cause the local security agent 206 and/or threat management facility 208 to initiate remedial measures, the notification 234 may explicitly (e.g., with a test tag or the like) or implicitly (e.g., by storing the identification in a data store of tests, or by specifying no remediation for the detection) indicate that the detected trigger 232 belongs to an update test, thereby eliminating the need for remediation such as quarantine, malware scanning, security updates, and the like. Rather, information related to the test, including the name of the particular test and the test results, can be logged by the updater 220, threat detection tools 214, or other component(s) of the threat management facility 208 for the purpose of further analysis and/or testing.

The checksum test can be accompanied by specialized reporting that categorizes the endpoint 202. For example, depending on how the endpoint 202 responds to the security update 228, the endpoint 202 may be categorized with a score or other metric to determine further action to be taken. In embodiments, if the endpoint 202 successfully downloads the security update 228 and then issues the notification 234, the endpoint 202 can be classified as healthy, or as properly updating. If the endpoint 202 has not been online recently (and therefore is expected to not have received the security update 228), it may be categorized as being offline, potentially requiring subsequent testing once back online. If the endpoint 202 has been online recently and has not received the security update 228, or if the endpoint 202 has received the endpoint but has not provided the responsive notification 234, the endpoint may be categorized as compromised or potentially compromised.

Another technique for detecting malware is behavioral analysis, also referred to as, e.g., behavioral analysis testing, or behavioral testing. Behavioral testing generally refers to methods of malware detection that focus on the behavior of a program rather than static features such as the literal code or a hash, signature, or the like of the underlying code. If a program behaves in a way that is typical of malware (e.g., trying to access a large number of files quickly, attempting to connect to known malicious IP addresses, or making suspicious changes to the operating system), it might be flagged as potentially malicious, even if its code does not match any known malware signature. This can be useful for detecting malware in the presence of a zero-day attack where a new form of malware does not have any pre-existing signature data, and for detecting malware that uses certain techniques such as polymorphism to evade detection. By observing the behavior of malware, security analysts can also better understand attack vectors and capabilities, such as data exfiltration, privilege escalation, or the initiation of further attacks.

In order to test the update infrastructure for behavioral detection rules, the security update 228 may include a detection rule 230 for behavioral detection by the local security agent 206, along with a trigger 232 including test code that invokes the corresponding behavior by on the endpoint 202, all of which may be packaged into any suitable payload for delivery to the endpoint 202. During the execution of the test code, the behavior described in the detection rule 230 is initiated on the endpoint 202. Thus the test code may generally cause the behavioral pattern to be carried out, either by executing a script, opening a command shell, launching an executable, launching an application, initiating an action with an application (e.g., with a script, programming environment, or the like within the application), and so forth. In one aspect, the test code may be configured to employ various techniques to evade detection, or to use other malware techniques. However, this is generally optional where the objective is to ensure that a local security agent 206 can receive and deploy a rule update, rather than to test how effective the local security agent 206 is at threat detection.

As with the static detection techniques described above, upon positive identification of the target behavioral pattern initiated by the trigger 232, the local security agent 206 may detect the behavior with the corresponding detection rule 230, and may transmit a corresponding notification 234 to the updated 220 or other component(s) of the threat management facility 208. The threat management facility 208 may log corresponding information such as the time the security update 228 was received by the endpoint 202, the time when the trigger 232 was detected, associated test results, contextual information for the endpoint (e.g., health status, software update versions, etc.), and so forth. In general, information associated with the notification 234 may be explicitly provided by the local security agent 206 and transmitted in the notification 234, determined based on other contextual information by the threat management facility 208, or some combination of these.

The behavioral analysis test can also be accompanied by specialized reporting that categorizes the endpoint 202. For example, depending on how the endpoint 202 responds to the security update 228, the endpoint 202 may be categorized with a score or other metric to determine further action to be taken. In embodiments, if the endpoint 202 successfully downloads the security update 228 and then issues the notification 234, the endpoint 202 can be classified as healthy, or as properly updating for behavioral detection. If the endpoint 202 has not been online recently (and therefore is expected to not have received the security update 228), it may be categorized as being offline, potentially requiring subsequent testing once back online. If the endpoint 202 has been online recently and has not received the security update 228, or if the endpoint 202 has received the endpoint but has not provided the responsive notification 234, the endpoint may be categorized as compromised or potentially compromised.

Another technique for detecting malware is Uniform Resource Locator (URL) based detection, which involves assessing the safety of URLs or network links to determine if they are potentially malicious or pose a security risk. URL-based testing can fall into various categories, such as URL scanning, URL filtering, URL sandboxing, and dynamic URL analysis, to name a few, any of which may detect potentially malicious activity based on a literal URL, or characteristics of a URL such as a portion of a URL (e.g., the path, the top level domain name, etc.), a pattern of multiple consecutive URL's, attempts at URL obfuscation, and so forth. Corresponding detection rules can be employed by the local security agent 202, and any of which may be tested for proper updating infrastructure as described herein.

In order to test the update infrastructure for URL-based detection rules, the security update 228 may include a detection rule 230 for URL-based detection by the local security agent 206, along with a trigger 232 including test code that uses a corresponding URL to invoke the detection rule 230, all of which may be packaged into any suitable payload for delivery to the endpoint 202. During the execution of the test code, the URL, or a URL or portion of a URL with characteristics described in the detection rule 230 are invoked, e.g., with a corresponding connection attempt by a web browser or other application. It will be noted that a corresponding URL may be created so that a successful connection can be made in this context. However, the URL does not need to exist, as the URL-based test can generally monitor an attempt to connect to the URL, rather than a successful attempt and/or reply. In one aspect, responsive URL's may be created and expired within a predetermined time window in order to permit an indirect detection of whether a responsive notification 234 is generated during the life of the URL.

As with the other detection techniques described above, upon positive detection of a network request with the corresponding URL content (or other usage of the corresponding URL content) initiated by the trigger 232, the local security agent 206 may provide a URL-based detection with the corresponding detection rule 230, and may transmit a corresponding notification 234 to the updated 220 or other component(s) of the threat management facility 208. The threat management facility 208 may log corresponding information such as the time the security update 228 was received by the endpoint 202, the time when the trigger 232 was detected, associated test results, contextual information for the endpoint (e.g., health status, software update versions, etc.), and so forth. In general, information associated with the notification 234 may be explicitly provided by the local security agent 206 and transmitted in the notification 234, determined based on other contextual information by the threat management facility 208, or some combination of these.

The URL-based test can also be accompanied by specialized reporting that categorizes the endpoint 202. For example, depending on how the endpoint 202 responds to the security update 228, the endpoint 202 may be categorized with a score or other metric to determine further action to be taken. In embodiments, if the endpoint 202 successfully downloads the security update 228 and then issues the notification 234, the endpoint 202 can be classified as healthy, or as properly updating for URL-based detection. If the endpoint 202 has not been online recently (and therefore is expected to not have received the security update 228), it may be categorized as being offline, potentially requiring subsequent testing once back online. If the endpoint 202 has been online recently and has not received the security update 228, or if the endpoint 202 has received the endpoint but has not provided the responsive notification 234, the endpoint may be categorized as compromised or potentially compromised.

While particular methodologies for malware detection testing have been described, there are a variety of other testing methodologies that could be employed without departing from the spirit and scope of the inventive concepts described herein. Thus, in general, any detection technique that can employ a detection rule 230 responsive to a trigger 232 may be tested for update infrastructure using the techniques described herein including without limitation signature-based techniques, heuristic-based techniques, behavioral-based techniques, sandboxing, cloud-based detection, reputation-based detection, machine-learning based detection, and so forth. Furthermore, a comprehensive malware protection strategy may involve a combination of different methods to ensure that both known and unknown threats are effectively mitigated. Thus, while these techniques are described individually, they may more generally be tested alone or in combination to ensure that a local security agent 206 is receiving and deploying security updates 228 from a threat management facility 208.

Figure 3:
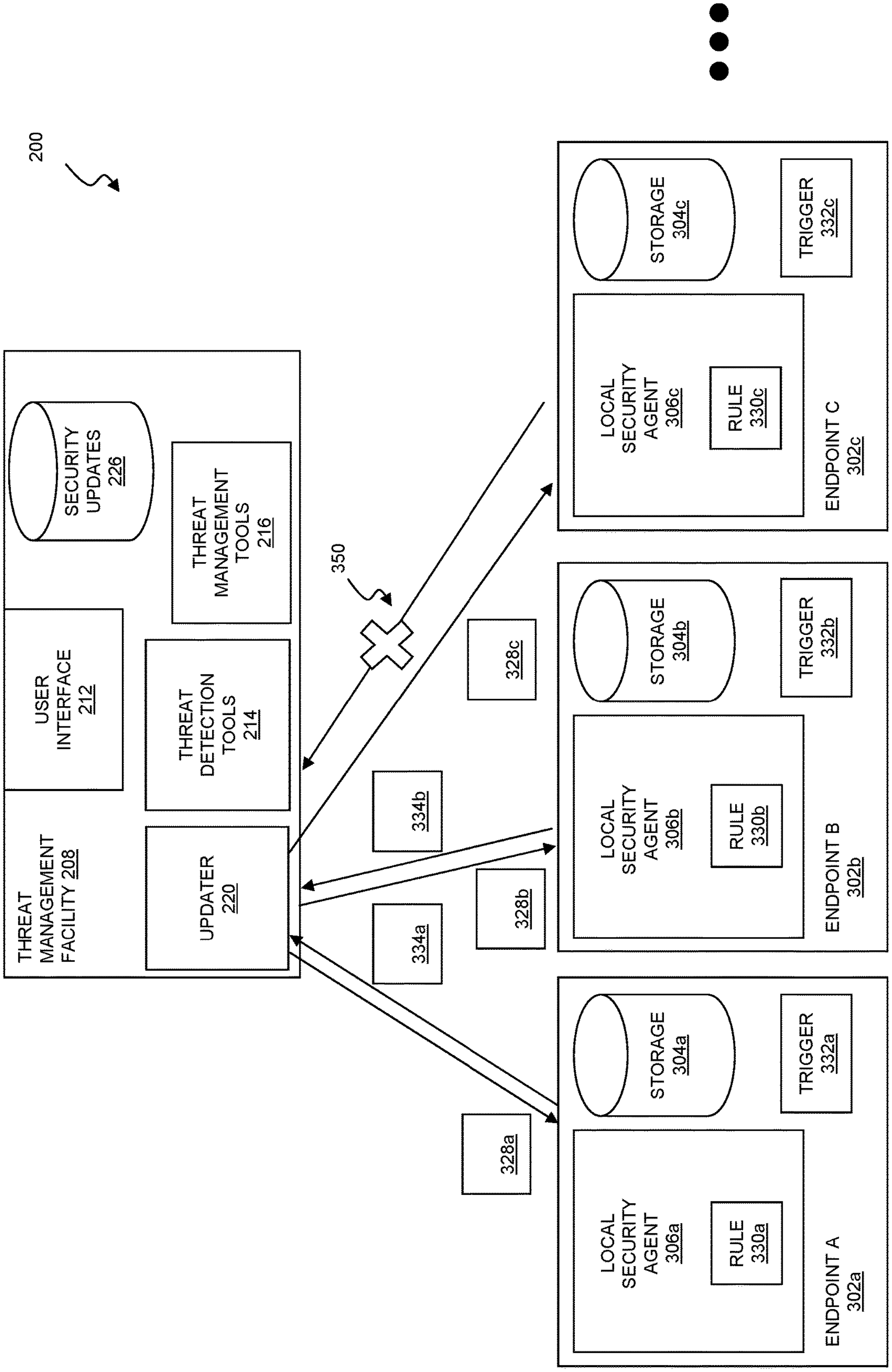
FIG. 3 is a block diagram of a system for testing a security update infrastructure.

FIG. 3 is a block diagram of a system for testing a security update infrastructure. As illustrated in FIG. 3, a threat management system 200, such as any of the threat management systems described herein, may be configured to test a security update infrastructure for a plurality of endpoints. In this example, security updates 328*a-c* are stored in security updates storage 226 on the threat management facility 208. The security updates 328*a-c* may include associated detection rules 330*a-c* and corresponding triggers 332*a-c* for the detection rules 330*a-c*. The security updates 328*a-c* may be accessible by a plurality of endpoints 302*a-c*, and may be pulled by the endpoints 302*a-c*, pushed by the threat management facility 208, or some combination of these in order to distributed the security updates 328*a-c* for periodic testing of a security update infrastructure as described herein. As depicted, the detection rules 330*a*-330*c* and triggers 322*a-c* are stored on the plurality of endpoints 302*a-c* of the threat management system 200. While three endpoints 302*a-c* are depicted, it will be understood that the threat management system 200 may include any number of endpoints, each of which may be configured to receive respective security updates 328 with corresponding detection rules 330 and triggers 332.

In embodiments, the security updates 328*a-c* represent separate instances of the same security update. The security updates 328*a-c* and associated triggers 332*a-c* may use any of the malware detection techniques described herein. In another aspect, different security updates 328*a-c* may be provided to the various endpoints 302*a-c*, e.g., to test different components of the local security agent 306 for each endpoint 302, or to adapt testing to varying capabilities of different endpoints and/or different local security agents.

Each of the local security agents 306*a-c* of the various endpoints 302*a-c* can be configured to transmit notifications 334 of detections to the threat management facility 208 if, for example, one of the detection rules 330*a-c* detects a corresponding one of the triggers 332*a-c*, indicating that the corresponding local security agent has properly updated. In the illustrated example, two of the local security agents 306*a*, 306*b* on two of the endpoints 302*a*, 302*b* have successfully updated with the detection rule 330*a*, 330*b* contained in the security update 328*a*, 328*b*. For example, the endpoint 302*a* may receive a security update 328*a* that includes a checksum test, and the trigger 332*a* may be a file with the corresponding checksum so that, when the file is stored on the endpoint 302*a*, the local security agent 306*a* detects the file and issues a notification 334*a* based on the detection.

In general, each security update 328*a-c* may be packaged, formatted, or otherwise stored and transmitted using any suitable data or file structure. In general, where the security updates 328*a-c* are compressed or otherwise packaged as a single data file, the detection rule 330*a-c* is preferably unpacked and stored before the trigger 332*a-c*, so that the local security agent 306*a-c* is able to apply the detection rule 330*a-c* and detect the trigger 332*a* when the trigger 332*a* is unpacked and deployed on the endpoint 302*a-c*. In another aspect, the security updates 228*a-c* and/or notifications 334*a-b* may be signed or otherwise encrypted or protected to avoid replay-type malicious interventions.

In embodiments, an endpoint 302*c* may receive a security update 328*c* (or the threat management facility may transmit the security update 328*c*) that includes a detection rule 330*c* and a trigger 332*c*, however, the combination of the detection rule 330*c* and the trigger 332*c* may fail to trigger a responsive notification to the threat management facility from the local security agent 306*c*. For example, the security update 328*c* may include a URL-based test, and the trigger 332*c* may include a URL (or portion of a URL) with characteristics that should be detected by the URL-based test. However, in the illustrated example, the endpoint 302*c* does not transmit a notification to the threat management facility 208, as depicted by a severed arrow 350. In embodiments, a lack of a response to a security update, in particular in the form of a responsive notification, can indicate an update failure, In one aspect, this may include the absence of a response within a predetermined time window measured from when the security update is made available, when the security update is transmitted to the endpoint, when the security update is received by the endpoint, or an interval or window of time measured in some other way.

In one aspect, a local security agent may transmit a separate notification when a security update is received, which provides a useful timeframe for evaluating when a response to the trigger might be expected. In another aspect, a new detection rule in a security update may be explicitly identified as an update test, in which case the local security agent may locally monitor for a responsive detection, and transmit a failure notification if no trigger is detected after a predetermined time period.

As a significant advantage, actively confirming updates—by transmitting a notification 334*a-b* indicating that an endpoint has received a security update, installed a corresponding rule, and made a new detection based on the corresponding rule—avoids incorrect inferences about security posture that might otherwise be drawn in the absence of malware detections or other information or reports from protected assets.

In one aspect, there may be a delay in time between a security update being made available, or transmitted to an endpoint, and a determination of the update status of the endpoint. For example, if an endpoint does not appear to be online when a security update is sent, or if the endpoint does not immediately request a security update when it becomes available, the endpoint may be afforded an amount of time to retrieve and/or apply the update and attempt the corresponding detection before it is categorized as compromised (or potentially compromised). The amount of time to wait for a reply may be chosen based on various factors such as the type of endpoint, an online presence for the endpoint, and the like. For example, endpoints that are of particular importance (e.g., endpoints providing network infrastructure, or endpoints associated with security administrators or other key personnel) may be given a relatively short amount of time to retrieve and properly respond to a security update. The expected connection status of the endpoint may also influence the amount of time afforded the endpoint for passing the security update test before being flagged as potentially at risk. For example, endpoint devices such as firewalls and gateways, which are generally expected to be online continuously (or some high percentage of the time, e.g., more than 99.9% of the time), may be required to transmit a notification indicative of a successful security update within a relatively short period of time following the security update being sent.

In embodiments, security update tests may be periodically cleaned up, e.g., by deleting one or more previous instances of detection rules and triggers for testing update infrastructure. After a successful update has been confirmed, these detection rules will not generally have any function on the endpoints, and may usefully be removed, particularly where limited storage resources are available to local security agents.

In embodiments, the results of a security update test may be viewed in a cumulative nature to determine the health of the overall system, e.g., by examining patterns of responsive notifications from protected assets. For example, where a pattern of responses shows that a group of endpoints in a particular logical or physical location, or associated with a particular firewall or gateway, have failed to respond, or are responding more slowly than other endpoints, this may be an indication of the locus of malicious activity and/or a related collection of compromised endpoints (or local security agents on such endpoints). Similarly, where a pattern of responses indicate that endpoints of a certain type (e.g., virtual compute instances, machine configurations (hardware, operating system, etc.), and so forth) are collectively responding differently to the security updates, this may indicate a machine-specific vulnerability that is being exploited.

According to the foregoing, in one aspect a remediation may be initiated in response to a predetermined pattern of responses to security updates, or other predetermined pattern of update activity. In one aspect, the predetermined pattern can include an absence of a test response from one (or more) of the plurality of endpoints that retrieved the security update from the threat management facility. In another aspect, the predetermined pattern of responses may include a malware detection unrelated to the security update from one of the plurality of endpoints after the one of the endpoints has received the security update. This advantageously detects the specific situation in which a local security agent remains active and operational but has been maliciously blocked from receiving new updates. In another aspect, the predetermined pattern may include an absence of security update requests from one or more of the plurality of endpoints. More generally a pattern of security updates and/or notification responses received from local security agents may provide useful information about potentially malicious activity that can be used to automatically direct remediations, or to steer manual investigations toward particular devices or groups of devices of potential interest.

Remediation may also take a variety of forms. For example, remediation can include a notification to initiate investigation of one or more of the plurality of endpoints. The remediation can also or instead include an automatic quarantine or recommendation to manually quarantine one or more of the plurality of endpoints. Other remediations may also or instead be automatically initiated, and/or recommended, such as isolation, malware scanning, reinstallation of local security agents, and so forth.

According to the foregoing, a security update infrastructure may be periodically and repeatedly tested to ensure that, independently of installed local security agents and detection rules, the integrity of the update process has not been compromised. This may be used, e.g., to monitor the update infrastructure for a wide range of endpoints including cloud based or virtual compute instances, mobile devices, enterprise network infrastructure, and so forth. It will also be understood that, while this description emphasizes the rule of updating in a security context, the techniques described herein may suitable be adapted to other software update infrastructures, and may generally be used to ensure that, independently from the success of particular software updates, the infrastructure for delivering updates is functioning properly.

Figure 4:
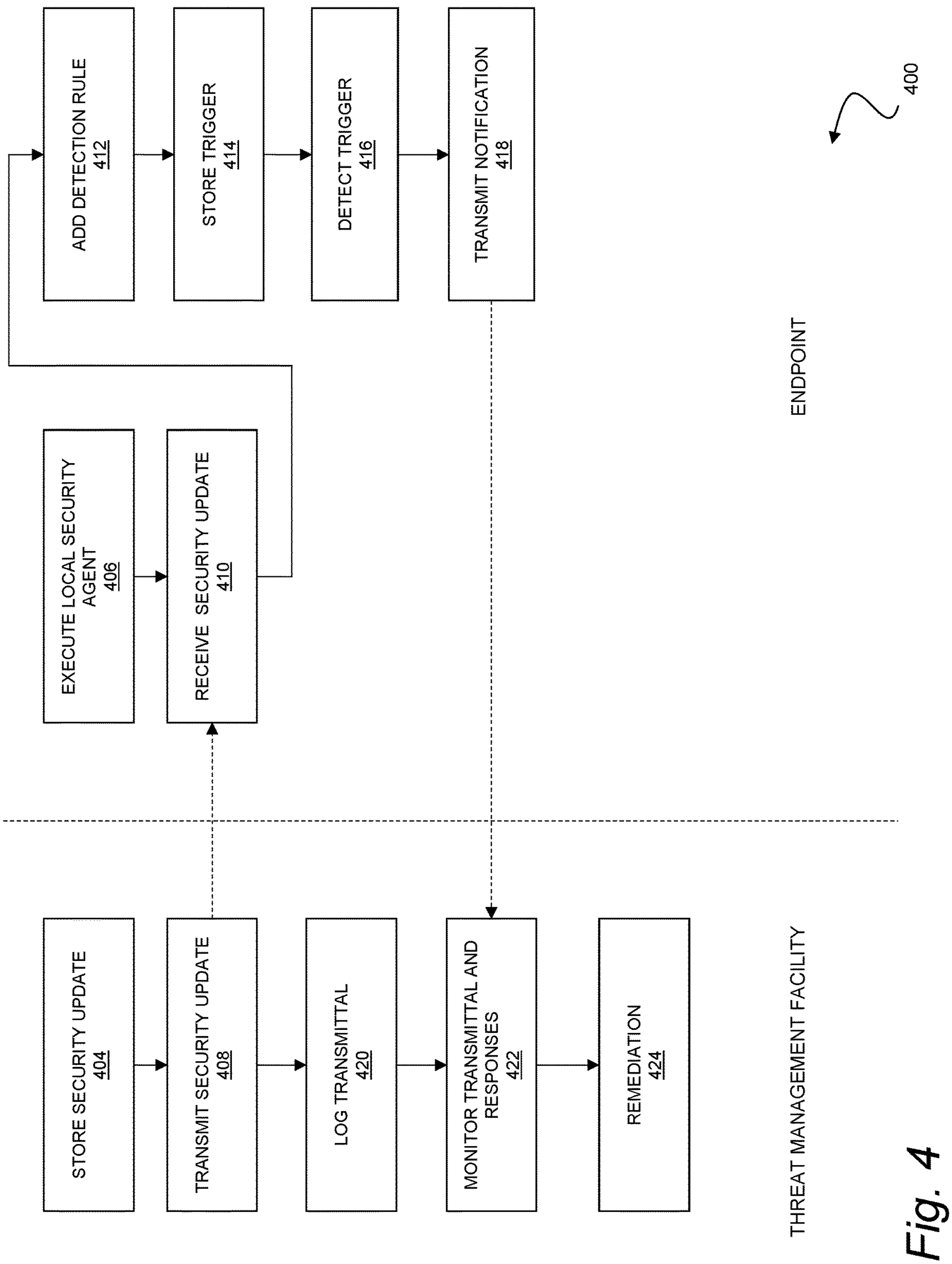
FIG. 4 is a flow chart of a method for testing a security update delivery infrastructure.

FIG. 4 is a flow chart of a method for testing a security update delivery infrastructure. In general, security updates with detection rules and accompanying triggers can be transmitted to local security agents for managed endpoints in an enterprise network. By monitoring the pattern of resulting detections received (as notifications) at a threat management facility for the enterprise network, endpoints that are not properly receiving and installing security updates can be identified and remediated.

As shown in step 404, the method 400 may include storing security updates, e.g., in a data store at a threat management facility or other location accessible to a plurality of endpoints managed by the threat management facility. In general, a security update may include new security updates for distribution to endpoints in the enterprise network. As described herein, at least one of the security updates may be a test update configured to test the security update delivery infrastructure for the enterprise network. In this latter respect, the security update may be any of the security updates described herein, and may include a detection rule along with a trigger for the detection rule. In one aspect the detection rule may be identified as a test rule, e.g., by explicitly tagging or otherwise labeling the detection rule to facilitate improved handling of test results by local security agents and the threat management facility. In another aspect, the detection rule may not be identified as a test rule, e.g., to avoid detection by malicious code on endpoints. The trigger may be generally free from malware, and may be configured to cause a detection by a local security agent when applying the detection rule.

As shown in step 406, the method 400 may include executing a local security agent, such as any of the local security agents described herein, on an endpoint such as any of the endpoints described herein. For example, the endpoint may include a user hardware device such as a laptop, desktop, tablet, smart phone, or other mobile or fixed computing device. In another aspect, the endpoint may be a compute instance hosted on a cloud computing resource or other virtual computing infrastructure. The endpoint may also or instead include a network device in the enterprise network, such as a router, a switch, a gateway, a firewall, a wireless access point, or some combination of these. The local security agent may generally be configured to provide local security services for the endpoint, and to report security events and the like to the threat management facility. In one aspect, the local security agent may be configured to receive periodic security updates from the threat management facility in order to adapt to an evolving malware environment.

As shown in step 408, the method 400 may include transmitting, from the threat management facility, a security update to the endpoint and/or to the local security agent executing on the endpoint. As further described herein, the security update may be configured to support testing of a security update infrastructure, and may include a detection rule and a trigger. In one aspect, this may include pushing the security update to the local security agent on a schedule managed by the threat management facility. In another aspect, this may also or instead include pulling the security update with the local security agent, e.g., by requesting a new security update whenever the endpoint is restarted, whenever a potential compromise is detected, and/or on some other predetermined schedule or the like. The detection rule and trigger may be packaged into a single file as the security update for retrieval by the plurality of endpoints.

As described herein, the detection rule may, for example, include a static detection rule, a behavioral test, a Uniform Resource Locator test, or any other suitable malware detection rule, algorithm, or the like. For example, in one aspect, the detection rule may include a static detection rule based on a checksum, and the trigger may be a test file with the checksum. In another aspect, the detection rule may include a behavioral detection rule, and the trigger may be configured to cause one of the plurality of endpoints to perform a plurality of activities associated with the behavioral detection rule. In another aspect, the detection rule may include a Uniform Resource Locator rule, and the trigger may be configured to cause the endpoint to try to connect to a network address specified in the Uniform Resource Locator rule. More generally, any detection rule, detection algorithm, detection data, detection model, or the like may usefully be tested for proper updating using the techniques described herein.

As shown in step 410, the method 400 may include receiving the security update at the endpoint, and/or at the local security agent executing on the endpoint. This may, for example, include retrieving the security update with the local security agent during a periodic update initiated by the local security agent or the threat management facility. Receiving the security update may also include unpacking, unzipping, decompressing, or otherwise extracting rules and other data from the security update for use by the local security agent. This may also or instead include verifying a signature for the security update or individual rules and/or triggers contained in the security update, or otherwise verifying the source or contents of the security update.

As shown in step 412, the method 400 may include adding the detection rule to a plurality of rules used by the local security agent to monitor the endpoint. These detection rules may be stored, for example, in the local security agent, or in some other data store on the endpoint accessible to the local security agent and used by the local security agent to store rules and/or other data.

As shown in step 414, the method 400 may include storing the trigger on the endpoint. In one aspect, this may include storing the trigger in response to adding the detection rule to the local security agent, or otherwise timing extraction of the trigger and deployment of the trigger on the endpoint to occur after the security agent is updated with the corresponding detection rule. This ensures that the local security agent is configured (assuming that it has properly received and installed the detection rule) to detect the trigger when the trigger is deployed on the endpoint.

As shown in step 416, the method 400 may include detecting the trigger with a detection by the local security agent based on the detection rule. In one aspect, the detection may be a real time, or substantially real time, detection upon storing the trigger on the endpoint, which may, for example, be based on monitoring of reads and writes by a file system of the endpoint so that the detection can be made (and a notification issued) without observable latency.

As shown in step 418, the method 400 may include transmitting a notification of the detection to the threat management facility, e.g., in response to a detection of a trigger as described herein. In one aspect, the notification may be transmitted immediately, e.g., substantially in real time or, directly in response to the detection by the local security agent. In another aspect, the notification may be stored in an event log or the like locally on the endpoint for communication to the threat management facility, e.g., on some predetermined schedule or in response to a query from the threat management facility.

Returning to the threat management facility, and as shown in step 420, the method 400 may include logging the transmittal (and/or a group of transmittals) at the threat management facility. This can facilitate improved detection of patterns of detections throughout an enterprise network or the like by permitting a more accurate mapping of transmittals to endpoints and notifications from endpoints, e.g., to locate endpoints that are known to have received a security update but have not yet responded with a corresponding notification.

As shown in step 422, the method 400 may include monitoring (and logging) test responses to the trigger (e.g., in the form of notifications) from the plurality of endpoints.

As shown in step 424, the method may include remediating the endpoint(s), e.g., based on a pattern of notifications received in response to a distribution of security updates. This may include initiating remediation of one or more of the plurality of endpoints in response to a predetermined pattern of transmittals (of security updates) and test response. A variety of patterns of transmittals and responses (or non-responses) may be used to detect potential compromises and direct remediation accordingly. For example, the predetermined pattern may include an absence of a test response from one of the plurality of endpoints that retrieved the security update from the threat management facility. In another aspect, the predetermined pattern may include a malware detection unrelated to the security update from one of the plurality of endpoints. In another aspect, the predetermined pattern may include an absence of security update requests from one or more of the plurality of endpoints.

The remediation may include any suitable remedial measures such as generating a notification to an administrator or other person or resource to initiate an investigation of one or more of the plurality of endpoints. In another aspect, the remediation may include one or more of a quarantine, an isolation, and a malware scan of one or more of the plurality of endpoints. In another aspect, the remediation may include a local security agent reinstallation on one or more of the plurality of endpoints, such as endpoints that have received a security update but have not transmitted a responsive notification of detection of the trigger.

According to the foregoing, there is also described herein a system for testing a security update infrastructure. The system may include a plurality of local security agents and a threat management facility. The plurality of security agents may be executing on a plurality of endpoints in an enterprise network, and each of the plurality of local security agents may be configured by a first computer executable code stored in a first non-transitory computer readable medium to manage security for a corresponding one of the endpoints based on a plurality of detection rules. The threat management facility may execute on a second one or more processors and may be configured by a second computer executable code stored in a second non-transitory computer readable medium to perform the steps of: storing a security update on a threat management facility at a location accessible to the plurality of endpoints, wherein the security update includes: a detection rule for local security agents on the plurality of endpoints, and a trigger for the detection rule, the trigger configured to cause a detection by one of the local security agents when applying the detection rule; transmitting the security update to one or more of the plurality of endpoints; logging transmittals of the security update to the one or more of the plurality of endpoints; logging test responses to the trigger from the plurality of endpoints to the trigger; and in response to a predetermined pattern of transmittals and test responses, initiating a remediation of one or more of the plurality of endpoints.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims.

What is claimed is:

1. A computer program product for actively testing security services for an enterprise network, the computer program product comprising computer executable code embodied in a non-transitory computer readable medium that, when executing on one or more computing devices, causes the one or more computing devices to perform the steps of:

executing a local security agent on an endpoint;

transmitting a security update from a threat management facility to the local security agent, wherein the security update includes:

a detection rule for the local security agent, the detection rule identified as a test rule, and a trigger for the detection rule, the trigger configured to cause a detection by the local security agent when applying the detection rule, and the trigger being free from malware requiring remediation of the endpoint;

adding the detection rule to a plurality of detection rules used by the local security agent to monitor the endpoint;

after adding the detection rule from the security update to the local security agent, deploying the trigger from the security update to the endpoint in a manner that satisfies the detection rule of the security update in order to evaluate whether the local security agent is updated with the detection rule;

verifying a security update process of the local security agent by detecting the trigger contained in the security update with the detection by the local security agent based on the detection rule contained in the security update; and transmitting a notification of the detection to the threat management facility.

2. The computer program product of claim 1, further comprising code that performs the step of retrieving the security update with the local security agent during a periodic update initiated by the local security agent or the threat management facility.

3. The computer program product of claim 1, wherein the detection rule includes a static detection rule.

4. The computer program product of claim 1, wherein the detection rule includes a behavioral test.

5. The computer program product of claim 1, wherein the detection rule includes a Uniform Resource Locator test.

6. The computer program product of claim 1, wherein the endpoint includes a network device in the enterprise network.

7. The computer program product of claim 6, wherein the network device includes at least one of a router, a switch, a gateway, a firewall, and a wireless access point.

8. A method for actively testing security services for an enterprise network, the method comprising:

storing a security update on a threat management facility at a location accessible to a plurality of endpoints managed by the threat management facility, wherein the security update includes:

a detection rule for local security agents on the plurality of endpoints, the detection rule identified as a test rule, and a trigger for the detection rule, the trigger configured to cause a detection by one of the local security agents when applying the detection rule;

transmitting the security update to one or more of the plurality of endpoints;

logging transmittals of the security update to the one or more of the plurality of endpoints;

after adding the detection rule from the security update to one of the local security agents, causing the trigger to deploy from the security update to a corresponding one of the plurality of endpoints in a manner that satisfies the detection rule of the security update;

logging test responses to the trigger from the plurality of endpoints, wherein logging test responses includes logging a verification of a security update process of one or more of the local security agents by detecting the trigger contained in the security update with a corresponding detection by each of the one or more of the local security agents based on the detection rule contained in the security update; and in response to a predetermined pattern of transmittals and test responses, initiating a remediation of one or more of the plurality of endpoints.

9. The method of claim 8, wherein the remediation includes a notification to initiate investigation of one or more of the plurality of endpoints.

10. The method of claim 8, wherein the remediation includes one or more of a quarantine, an isolation, and a malware scan of one or more of the plurality of endpoints.

11. The method of claim 8, wherein the remediation includes a local security agent reinstallation on one or more of the plurality of endpoints.

12. The method of claim 8, wherein the predetermined pattern includes an absence of one of the test responses from one of the plurality of endpoints that retrieved the security update from the threat management facility.

13. The method of claim 8, wherein the predetermined pattern includes a malware detection unrelated to the security update from one of the plurality of endpoints.

14. The method of claim 8, wherein the predetermined pattern includes an absence of security update requests from one or more of the plurality of endpoints.

15. The method of claim 8, wherein the detection rule and the trigger are packaged into a single file as the security update for retrieval by the plurality of endpoints.

16. The method of claim 8, wherein the detection rule includes a static detection rule based on a checksum, and wherein the trigger is a test file with the checksum.

17. The method of claim 8, wherein the detection rule includes a behavioral detection rule, and wherein the trigger is configured to cause one of the plurality of endpoints to perform a plurality of activities associated with the behavioral detection rule.

18. The method of claim 8, wherein the detection rule includes a Uniform Resource Locator rule, and wherein the trigger is configured to cause a receiving one of the plurality of endpoints to try to connect to a network address specified in the Uniform Resource Locator rule.

19. The method of claim 8, wherein the detection is a real time detection based on monitoring of reads and writes by a file system of a receiving one of the endpoints.

20. A system comprising:

a plurality of local security agents executing on a plurality of endpoints in an enterprise network, each of the plurality of local security agents configured by a first computer executable code stored in a first non-transitory computer readable medium to manage security for a corresponding one of the endpoints based on a plurality of detection rules; and a threat management facility for the enterprise network, the threat management facility executing on a second one or more processors and configured by a second computer executable code stored in a second non-transitory computer readable medium to perform the steps of:

storing a security update on the threat management facility at a location accessible to the plurality of endpoints, wherein the security update includes:

a detection rule for local security agents on the plurality of endpoints, and a trigger for the detection rule, the trigger configured to cause a detection by one of the local security agents when applying the detection rule, transmitting the security update to one or more of the plurality of endpoints, logging transmittals of the security update to the one or more of the plurality of endpoints, after adding the detection rule from the security update to one of the local security agents, causing the trigger to deploy from the security update to a corresponding one of the plurality of endpoints in a manner that satisfies the detection rule of the security update, logging test responses to the trigger from the plurality of endpoints, wherein logging test responses includes logging a verification of a security update process of one or more of the local security agents by detecting the trigger contained in the security update with a corresponding detection by each of the one or more of the local security agents based on the detection rule contained in the security update, and in response to a predetermined pattern of transmittals and test responses, initiating a remediation of one or more of the plurality of endpoints.

* * * * *